United States Patent
Park et al.

(10) Patent No.: US 7,649,590 B2
(45) Date of Patent: Jan. 19, 2010

(54) BACKLIGHT ASSEMBLY AND LIQUID CRYSTAL DISPLAY HAVING THE SAME

(75) Inventors: Se-ki Park, Suwon-si (KR); Joo-woan Cho, Seoul (KR); Gi-cherl Kim, Yongin-si (KR); Seok-hyun Nam, Seoul (KR); Sang-yu Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 584 days.

(21) Appl. No.: 11/344,799

(22) Filed: Jan. 31, 2006

(65) Prior Publication Data

US 2006/0256254 A1    Nov. 16, 2006

(30) Foreign Application Priority Data

May 12, 2005    (KR) .................... 10-2005-0039744

(51) Int. Cl.
*G02F 1/1335* (2006.01)
*F21V 7/04* (2006.01)
*G02B 6/42* (2006.01)

(52) U.S. Cl. ............................ 349/65; 349/61; 349/62; 385/39; 385/901; 362/27; 362/612; 362/613; 362/621

(58) Field of Classification Search ............ 349/61–62, 349/65; 385/39, 901; 362/27, 558, 561, 362/612–613, 621
See application file for complete search history.

(56) References Cited

U.S. PATENT DOCUMENTS 7,182,499 B2 *    2/2007    Chen et al. .................. 362/621

FOREIGN PATENT DOCUMENTS

| JP | 2002-196151 | | 7/2002 |
| JP | 2002196151 | * | 7/2002 |
| JP | 2003-215346 | | 7/2003 |
| KR | 2003-0043257 | | 6/2003 |

\* cited by examiner

*Primary Examiner*—Frank G Font
*Assistant Examiner*—Michael P Mooney
(74) *Attorney, Agent, or Firm*—Cantor Colburn LLP

(57) ABSTRACT

An LCD includes an LCD panel, a light guiding plate disposed at a rear of the LCD panel and having a light incident surface on which a curved surface pattern is formed, and a point light source facing the light incident surface and disposed closer to the LCD panel than to a center of thickness of the light incident surface. Accordingly, the LCD including the point light source has excellent light efficiency and brightness uniformity.

23 Claims, 17 Drawing Sheets

BACKLIGHT ASSEMBLY AND LIQUID CRYSTAL DISPLAY HAVING THE SAME

This application claims priority to Korean Patent Application No. 2005-0039744, filed on May 12, 2005 and all the benefits accruing therefrom under 35 U.S.C. §119, and the contents of which in its entirety are herein incorporated by reference.

BACKGROUND OF THE INVENTION

1. Field of the Invention

The present invention relates to a backlight assembly and a liquid crystal display having the same, and more particularly, the present invention relates to a backlight assembly and a liquid crystal display having improved light efficiency and brightness uniformity.

2. Description of the Related Art

Recently, a flat panel display apparatus, such as a liquid crystal display ("LCD"), a plasma display panel ("PDP"), and an organic light emitting diode ("OLED"), has been developed in place of a cathode ray tube ("CRT").

An LCD includes an LCD panel having a thin film transistor ("TFT") substrate, a color filter substrate, and a liquid crystal layer interposed between the TFT substrate and the color filter substrate. Since the LCD panel does not emit light by itself, the LCD may further include a backlight unit disposed in a rear area of the LCD panel. The transmittance of the light from the backlight unit is adjusted according to an alignment of liquid crystal molecules within the liquid crystal layer. The LCD panel and the backlight unit are accommodated in a chassis.

The backlight unit may be classified into an edge type and a direct type according to a location of a light source within the backlight unit. The edge type has the light source at the side of a light guiding plate and is used for a relatively small-sized LCD such as a laptop and a desktop computer. The edge type generally has high light uniformity and a good endurance, and is suitable to make the LCD thin.

A point light source, such as a light emitting diode ("LED"), has recently been used for a light source for the edge type backlight unit. The point light source is disposed on a side of the light guiding plate, that is, along a light incident surface of the light guiding plate, and is disposed at regular intervals. Unlike a line light source such as a lamp, light from the point light source is not uniformly provided to the light incident surface of the light guiding plate. Therefore, brightness of the edge type backlight unit using a point light source becomes non-uniform since a portion of the light guiding plate corresponding to the point light source is bright and a space on the light guiding plate corresponding to between point light sources is dark. Furthermore, a large part of light from the point light source becomes total-reflected and therefore extinct and unusable by the LCD panel. Therefore, light efficiency may disadvantageously be low.

BRIEF SUMMARY OF THE INVENTION

Accordingly, it is an aspect of the present invention to provide an LCD using a point light source and having excellent light efficiency and brightness uniformity. The foregoing and/or other aspects of the present invention are achieved by providing an LCD including an LCD panel, a light guiding plate disposed adjacent the LCD panel and including a light incident surface having a curved surface pattern formed thereon, the light incident surface having a first edge and an opposite second edge, the first edge closer to the liquid crystal display panel than the second edge, and a point light source facing the light incident surface and disposed closer to the first edge of the light incident surface than to the second edge of the light incident surface.

According to an exemplary embodiment of the present invention, the point light source is disposed within a range of 0.1~0.3 times a thickness of the light incident surface closer to the first edge of the light incident surface than to a center of the thickness of the light incident surface.

According to an exemplary embodiment of the present invention, the point light source is an LED.

According to an exemplary embodiment of the present invention, the LED is disposed in plural at regular intervals and the curved surface pattern is respectively formed corresponding to the LED.

According to an exemplary embodiment of the present invention, a plurality of half sphere shaped patterns are formed outwardly on the light incident surface.

According to an exemplary embodiment of the present invention, a plurality of half sphere shaped patterns are formed concavely on the light incident surface.

According to an exemplary embodiment of the present invention, the half sphere shaped pattern is formed on the overall light incident surface.

According to an exemplary embodiment of the present invention, a diameter of the half sphere shaped pattern is 0.05 times or more of the thickness of the light incident surface.

According to an exemplary embodiment of the present invention, depth of the half sphere shaped pattern is 0.2 times or more of the diameter thereof.

According to an exemplary embodiment of the present invention, a plurality of half cylinder shaped patterns are formed outwardly on the light incident surface.

According to an exemplary embodiment of the present invention, a plurality of half cylinder shaped patterns are formed concavely on the light incident surface.

According to an exemplary embodiment of the present invention, the half cylinder shaped pattern is formed in the thickness direction of the light incident surface.

According to an exemplary embodiment of the present invention, depth of the half cylinder shaped pattern is 0.2 times or less of the diameter thereof.

According to an exemplary embodiment of the present invention, a wave pattern is formed on the light incident surface.

According to an exemplary embodiment of the present invention, the curved surface pattern includes a plurality of ellipsoid shapes formed on the light incident surface.

According to an exemplary embodiment of the present invention, a plurality of point light sources are included and the curved surface pattern includes a plurality of curved shapes arranged in a one to one correspondence with the point light sources.

According to an exemplary embodiment of the present invention, a plurality of point light sources are included and the curved surface pattern includes a plurality of curved shapes outnumbering the point light sources and dispersed along the light incident surface.

According to an exemplary embodiment of the present invention, the curved surface pattern includes a curved shape, the curved shape having a surface defining variable distances from the point light source.

According to another exemplary embodiment of the present invention, a backlight assembly includes a light guiding plate including a light incident surface having a curved surface pattern formed thereon and a point light source facing the light incident surface and disposed closer to a first edge of the light incident surface than to a second edge of the light incident surface.

According to an exemplary embodiment of the present invention, a plurality of point light sources are included and the curved surface pattern includes a plurality of curved shapes, each curved shape aligned with each point light source, respectively.

According to an exemplary embodiment of the present invention, a planar surface on the light incident surface is disposed between adjacent curved shapes.

According to an exemplary embodiment of the present invention, the curved surface pattern includes a plurality of curved shapes, each curved shape having a surface defining variable distances from the point light source.

According to an exemplary embodiment of the present invention, the point light source is a light emitting diode, a center of the light emitting diode spaced a distance within a range of 0.1 to 0.3 times a thickness of the light incident surface from a center of the light incident surface in a direction towards the first edge of the light incident surface.

According to an exemplary embodiment of the present invention, the first edge of the light incident face is also an edge of a light exiting surface of the light guiding plate.

BRIEF DESCRIPTION OF THE DRAWINGS

The above and/or other aspects and advantages of the present invention will become apparent and more readily appreciated from the following description of the exemplary embodiments, taken in conjunction with the accompanying drawings of which.

DETAILED DESCRIPTION OF THE INVENTION

Figure 1:
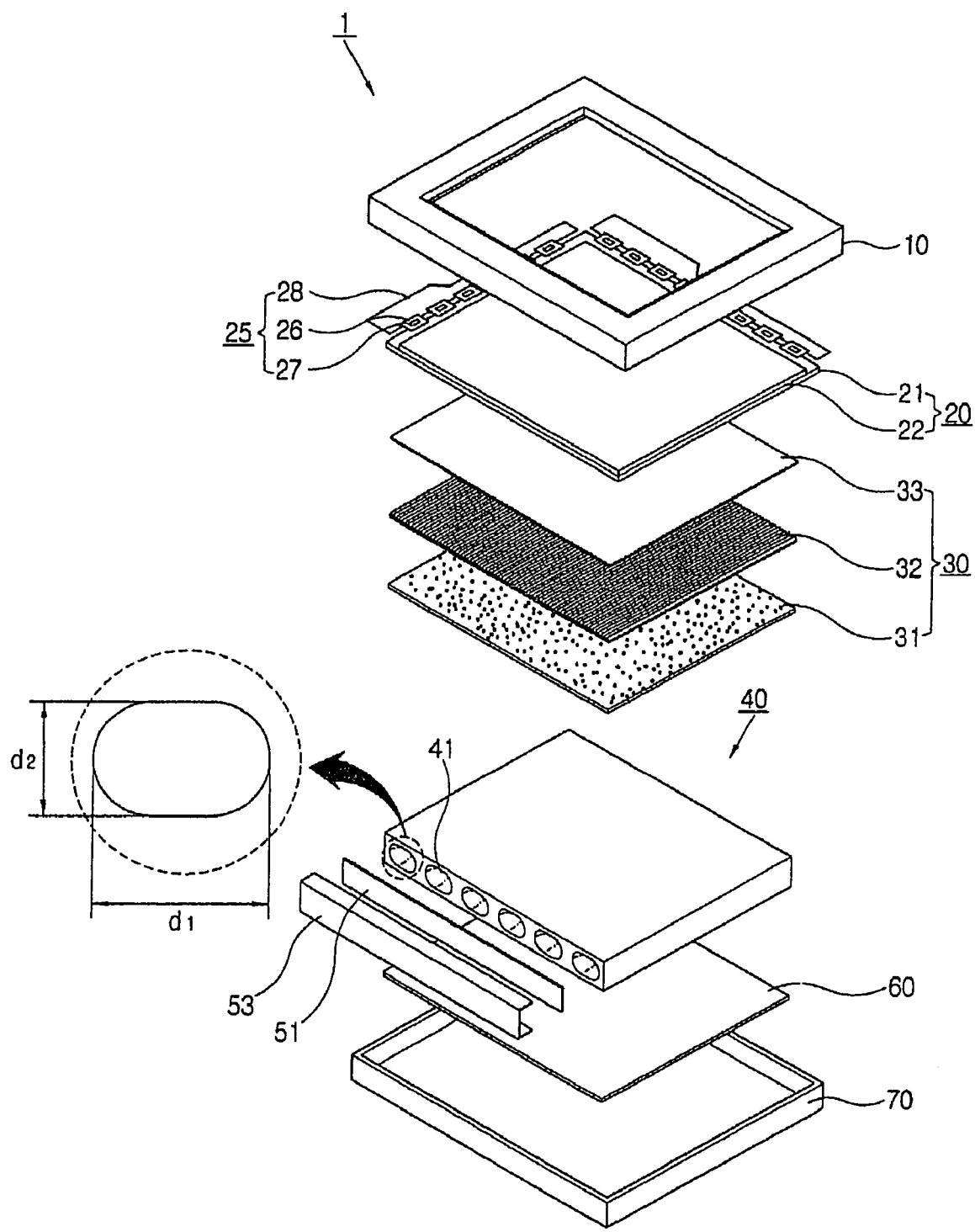
FIG. 1 is an exploded perspective view of a first exemplary embodiment of an LCD according to the present invention.

Reference will now be made in detail to exemplary embodiments of the present invention, examples of which are illustrated in the accompanying drawings, wherein like reference numerals refer to like elements throughout. The embodiments are described below in order to explain the present invention by referring to the figures.

In the following embodiments, a point light source will be described with a light emitting diode ("LED") as an example, but it is not limited to an LED. Other point light sources incorporated into the LCDs of the embodiments described herein would also be within the scope of these embodiments.

Figure 2:
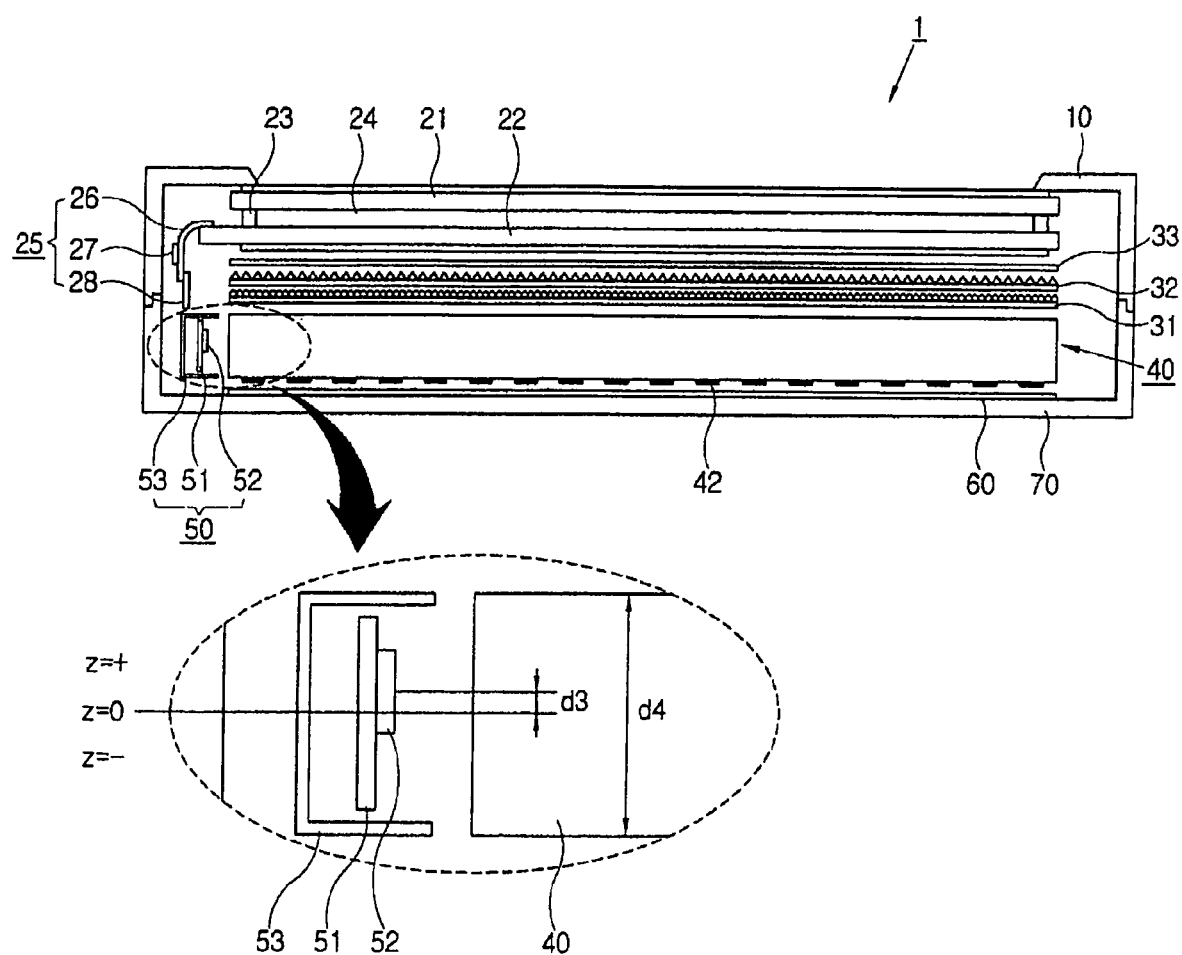
FIG. 2 is a sectional view of the first exemplary embodiment of the LCD according to the present invention.
Figure 3:
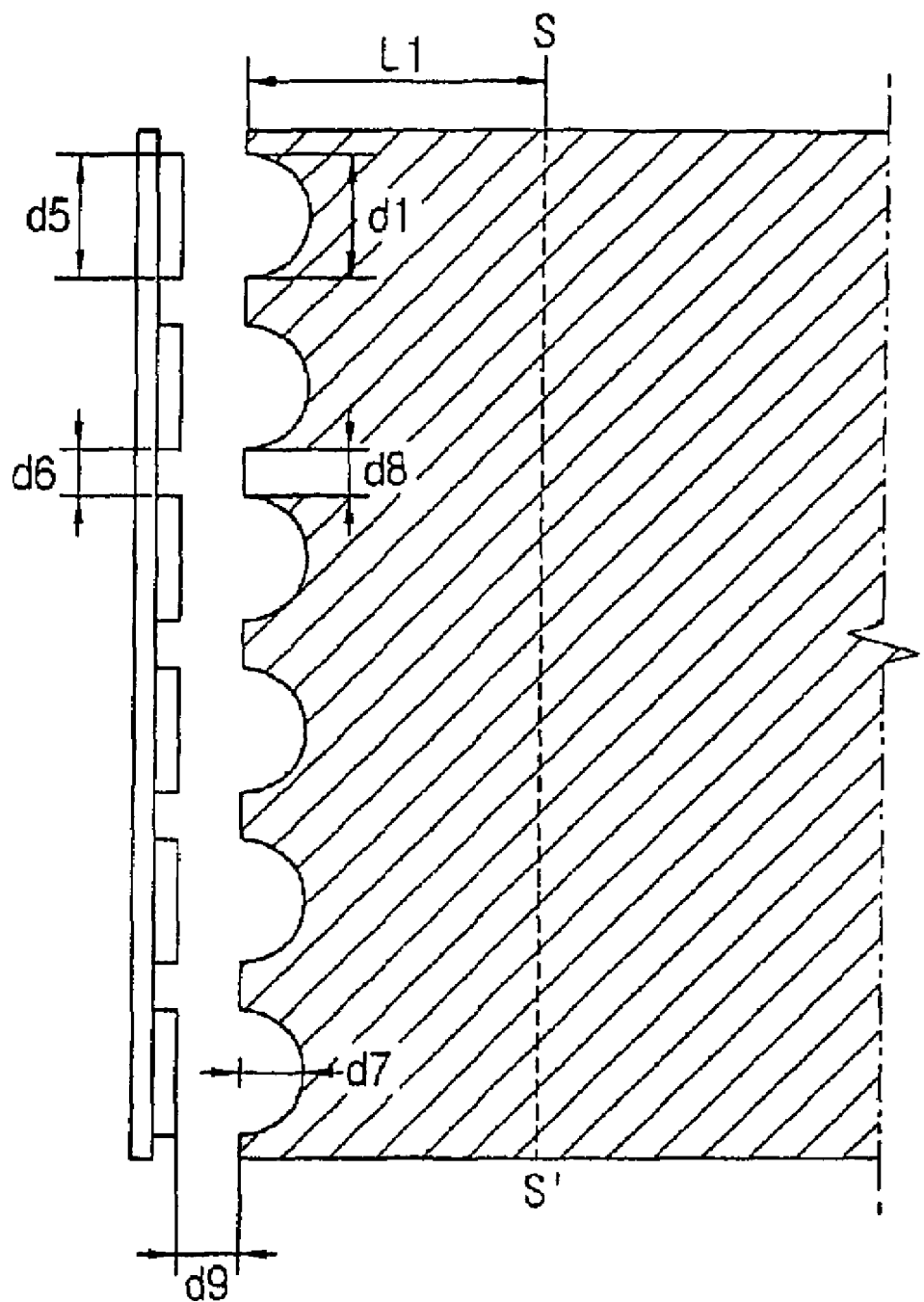
FIG. 3 is a plan view of an exemplary main part of the first exemplary embodiment of the LCD according to the present invention.

FIG. 1 is an exploded perspective view of the first exemplary embodiment of an LCD; FIG. 2 is a sectional view of the first exemplary embodiment of the LCD; and FIG. 3 is a plan view of an exemplary main part of the first exemplary embodiment of the LCD according to the present invention.

An LCD 1 comprises an LCD panel 20, an optical film 30 disposed below or at a rear of the LCD panel 20, and a light guiding plate 40 disposed below or at a rear of the optical film 30. The light guiding plate 40 provides light from a light source part 50 to the optical film 30. The light source part 50 is disposed along one side of the light guiding plate 40 and a reflecting plate 60 is disposed under the light guiding plate 40. The LCD panel 20, the optical film 30, the light guiding plate 40, the light source part 50, and the reflecting plate 60 are disposed between a top chassis 10 and a bottom chassis 70.

The LCD panel 20 includes a TFT substrate 21 on which TFTs are formed, a color filter substrate 22 facing the TFT substrate 21, a sealant 23 adhering the two substrates 21, 22 to each other and forming a cell gap therebetween, and a liquid crystal layer 24 encompassed by the two substrates 21, 22 and the sealant 23. The LCD panel 20 controls alignment of liquid crystal molecules within the liquid crystal layer 24, thereby forming an image thereon. The LCD panel 20 is provided with light from the light source part 50 disposed at its rear, since the LCD panel 20 does not emit light by itself.

On a side of the TFT substrate 21 is disposed a driving part 25 applying driving signals. The driving part 25 includes a flexible printed circuit ("FPC") 26, a driving chip 27 seated on the FPC 26, and a printed circuit board ("PCB") 28 connected on a side of the FPC 26. Here, the driving part 25 shown in FIG. 1 is formed in a chip on film ("COF") type. However, any other suitable type, such as tape carrier package ("TCP"), chip on glass ("COG"), etc., may also be applied to the driving part 25. Moreover, the driving part 25 may be formed on the TFT substrate 21 while wirings are formed.

The optical film 30 disposed at a rear of the LCD panel 20 may include a diffusion film 31, a prism film 32, and a protection film 33. The optical film 30 is provided between the LCD panel 20 and the light guiding plate 40.

The diffusion film 31 includes a base plate and a coating layer having beads formed on the base plate. The diffusion film 31 uniformly diffuses light provided from the light guiding plate 40 to an overall surface of the LCD panel 20, though brightness of the light from the light guiding plate 40 may already be uniform.

A triangular prism is formed on the prism film 32 at a predetermined alignment. The prism film 32 concentrates the light diffused from the diffusion plate 31 in a direction perpendicular to a surface of the LCD panel 20. Typically, two prism films 32 are used and the micro prism formed on each prism film 32 makes a predetermined angle with each other. The light passing through the prism film 32 mostly continues vertically, thereby forming a uniform brightness distribution.

The protection film 33 disposed on top of the optical film 30 protects the prism film 32 which would otherwise be vulnerable to a scratch.

While a specific exemplary embodiment for the optical film 30 has been described, it should be understood that alternate embodiments may include more or less optical sheets for performing various optical functions on the light passing there through. In yet another alternate embodiment, an LCD may be provided that does not include the optical film 30.

The light guiding plate 40 is disposed under the diffusion film 31, and positioned between the optical film 30 and the reflection plate 60. The light guiding plate 40 is formed in a nearly rectangular shape and is made of polymethyl methacrylate ("PMMA"), which is acryl resin. While a particular shape and material is described for the LCD 1, alternate shapes and materials for the light guiding plate 40 suitable for the LCD 1 would also be within the scope of these embodiments. The light guiding plate 40 converts light from the light source part 50 disposed on a side of the light guiding plate 40 into plane surface light and provides the plane surface light to the diffusion film 31. That is, the light guiding plate 40 converts light in the horizontal direction into light in the vertical direction. The light guiding plate 40 includes a light incident surface facing the light source part 50 and a light exiting surface facing the LCD panel 20. Light incident to the light incident surface exits through an overall surface of the light exiting surface.

A curved surface pattern is formed on the light incident surface of the light guiding plate 40, such as a concaved half sphere shaped pattern 41 in the first exemplary embodiment. The shapes in the curved surface pattern for the embodiments of the present invention as will be further described may include concavities, convexities, indentations, protrusions, irregularities, grooves, rounded portions, etc., all of which may be generally termed shapes. The half sphere shaped pattern 41 in the illustrated embodiment includes a half sphere shape and a half ellipsoid shape which are formed concavely. The half sphere shaped pattern 41 in the first embodiment is a half ellipsoid shape having a longer diameter d1 than a height d2.

The half sphere shaped pattern 41 includes a plurality of concavities or shapes. Each of the plurality of concavities of shapes has the same shape and is disposed at regular intervals. In other words, the shapes are evenly distributed across the light incident surface of the light guiding plate 40. The half sphere shaped pattern 41 is formed corresponding to an LED 52, as will be further described below. That is, in one embodiment, the shapes of the pattern 41 and the LEDs 52 have a one to one correspondence such that each LED 52 is aligned with a single shape in the pattern 41.

On the underside of the light guiding plate 40 is formed a stripe pattern 42. The stripe pattern 42 includes rows of stripes disposed parallel with the light source part 50 and made of a material having an excellent reflectance.

The light source part 50 is disposed along the light incident surface of the light guiding plate 40 and includes an LED circuit board 51, the LED 52 seated on an LED circuit board 51, and a reflector 53 at least partially surrounding the LED circuit board 51 as illustrated. By LED 52, it should be understood that a plurality of LEDs may be distributed along the LED circuit board 51.

The LED circuit board 51 has a bar shape and is disposed facing the light incident surface of the light guiding plate 40. The LED circuit board 51 may be made of aluminum having excellent heat conductivity as a main material, since a significant amount of heat is generated in the LED 52. Although not shown in the Figures, the LCD 1 may further include a heat pipe, a radiating fin, and a cooling fan so as to additionally emit heat.

The LED 52 is provided in plural and spaced equally on the LED circuit board 51. Each LED 52 may be a white light providing unit comprised of blue, red, and green LEDs 52.

The reflector 53 reflects light generated from the LED 52 to the light incident surface of the light guiding plate 40. The reflector 53 may be made of, for example, aluminum having a good reflectance or other suitable material and the surface facing the LED 52 and the light incident face of the light guiding plate 40 may be coated with silver.

Here, the LED 52 is not disposed at a position on the LED circuit board 51 corresponding to the center (z=0) of the light incident surface. That is, the LED 52 is disposed at a position on the LED circuit board 51 corresponding to a position of the light incident surface closer to the LCD panel 20 (z=+) than to the center (z=0) of the thickness of the light incident surface. In an exemplary embodiment, a distance d3 between the center of the LED 52 and the center of the thickness d4 of the light incident surface may be 0.1~0.3 times the thickness d4 of the light incident surface.

The reflecting plate 60 disposed under the light guiding plate 40 reflects light leaking from the light guiding plate 40 and provides the light again to the light guiding plate 40. The reflecting plate 60 may be made, for example, of polyethylene terephthalate ("PET"), polycarbonate ("PC"), etc.

Figure 4:
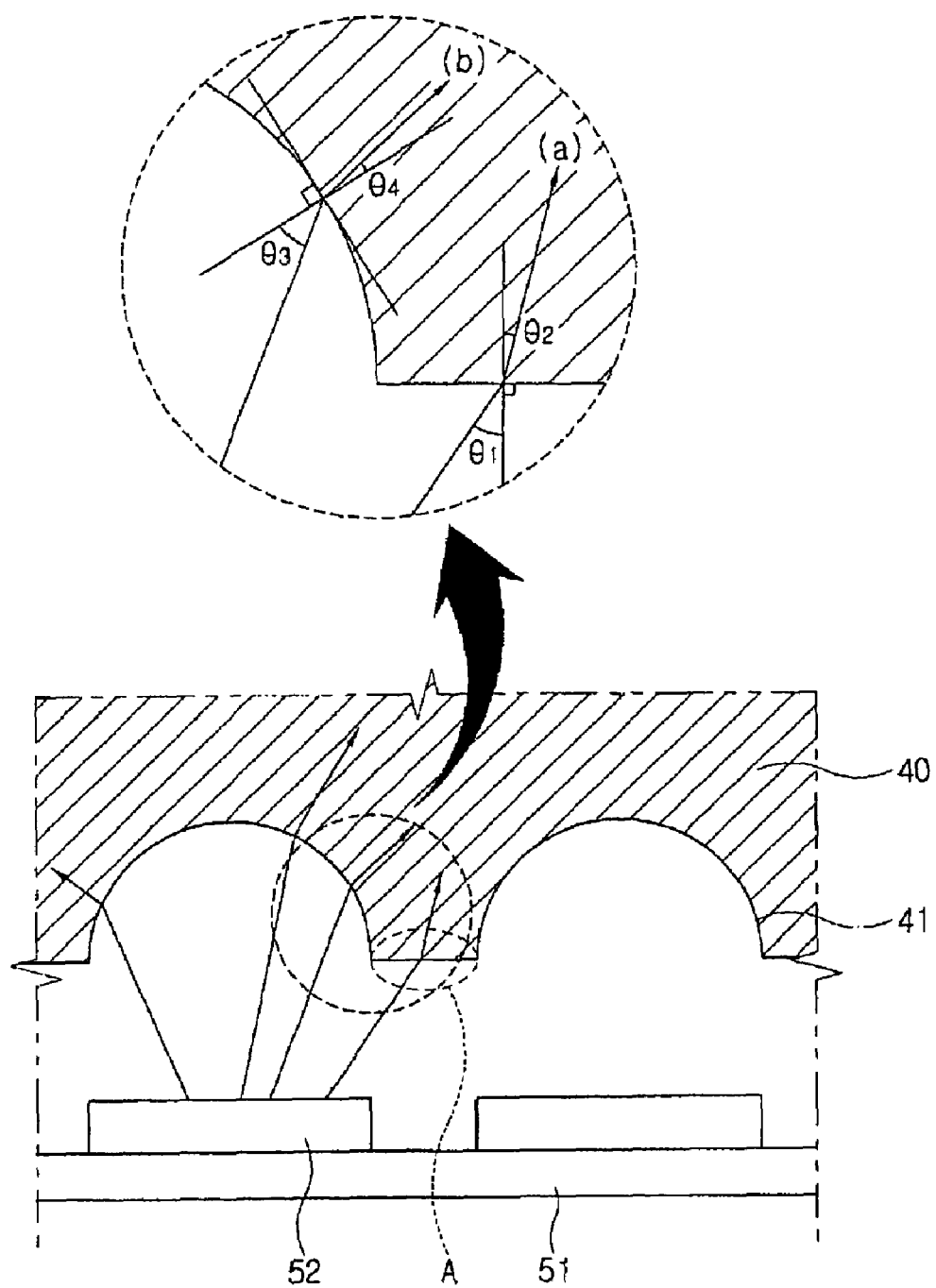
FIG. 4 illustrates an exemplary flow of light in the first exemplary embodiment of the LCD according to the present invention.

The LCD according to the present invention has excellent light efficiency and brightness uniformity, as will be described with reference to FIGS. 4 through 6.

First, functions of the half sphere shaped pattern in the first exemplary embodiment of the LCD according to the present invention will be described with reference to FIG. 4. FIG. 4 illustrates an exemplary flow of light in the first exemplary embodiment of the LCD according to the present invention. Light incident to the light guiding plate 40 from air, whether originated from the LEDs 52, the reflector 53, or another source, is refracted by a difference of refractivity between the air and the light guiding plate 40. Since the light guiding plate 40 has a higher refractivity than the air, an exit angle is smaller than an incidence angle according to Snell's law.

Light (a) incident to a plane area 'A' not having the half sphere shaped pattern 41 has a smaller exit angle $\theta_2$ than the incidence angle $\theta_1$ and the light continues into the light guiding plate 40. The angles $\theta_1$ and $\theta_2$ are measured from a line perpendicular to the plane area 'A'. Accordingly, the light provided to the plane area 'A', which is spaced between a position corresponding to a position between the LEDs 52, decreases and on the plane area 'A' may possibly be formed an obscure part. However, since the half sphere shaped pattern 41 is provided corresponding to the LED 52 in the first embodiment, most of the light generated from the LED 52 is incident to the half sphere shaped pattern 41. An incidence angle $\theta_3$ of the light (b) incident to the half sphere shaped pattern 41 is formed in an opposite direction of the incidence angle $\theta_1$ of the light (a) incident to the plane area 'A' due to the curved surface of the half sphere shaped pattern 41. The incidence angle $\theta_3$ and the exit angle $\theta_4$ are measured from a line perpendicular to a line tangent at a point that the light (b) is incident on the curved portion of the half sphere shape. Since the incident light (b). has a smaller exit angle $\theta_4$ than the incidence angle $\theta_3$, its continuing angle becomes large. Therefore, the light (b) incident to the half sphere shaped pattern 41 is largely provided to the space within the light guiding plate located adjacent the plane 'A' positioned correspondingly between the LEDs 52, thereby removing the obscure part of the light guiding plate 40 and improving brightness uniformity.

Figure 5A:
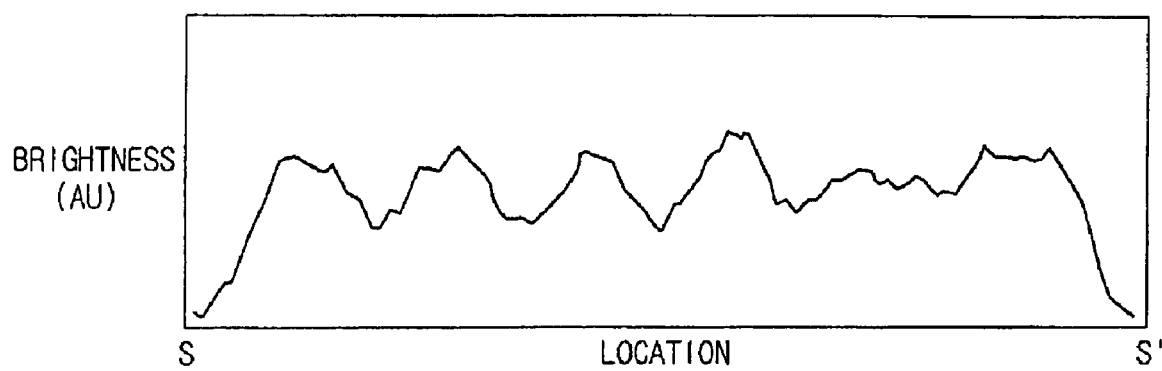
FIGS. 5a through 5c are graphs showing a distribution of brightness according to locations of an LED with respect to a light guiding plate.
Figure 5B:
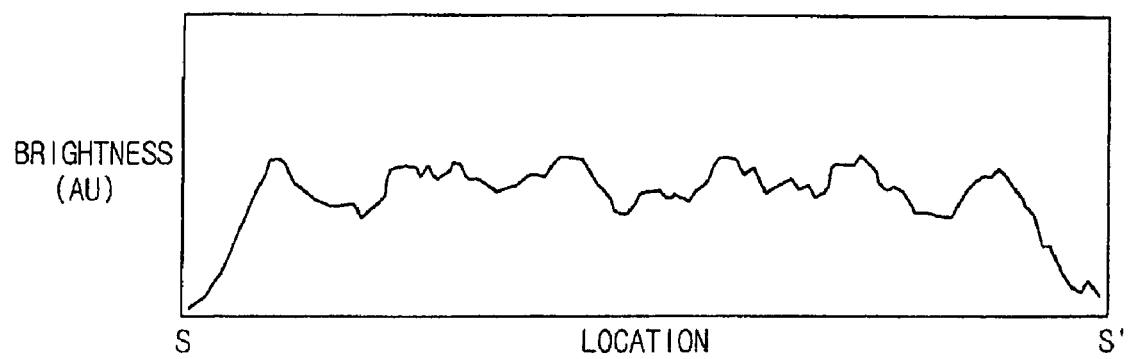
Figure 5C:
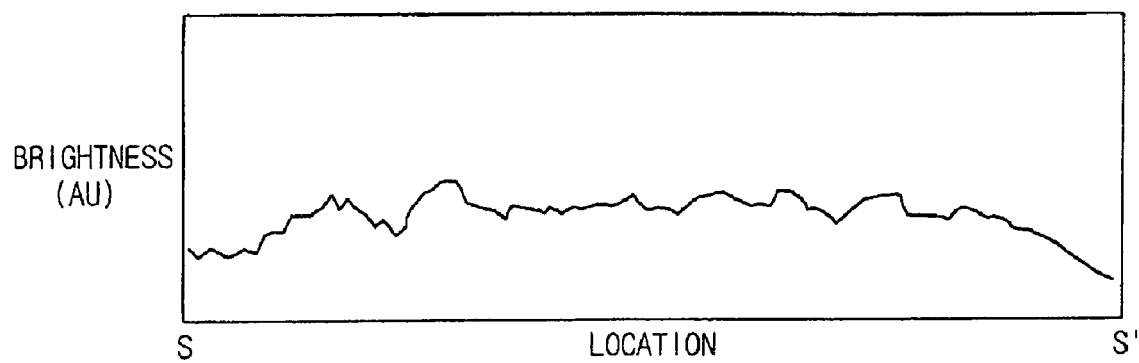

Hereinafter, a reason for disposing an LED higher than the center of the thickness of a light incident surface will be described with reference to FIGS. 5a through 5c. FIGS. 5a through 5c are graphs showing a distribution of brightness according to locations of the LED with respect to the light guiding plate.

FIGS. 5a through 5c show brightness of an S-S' line, illustrated in FIG. 3, where the brightness readings are acquired through simulation.

As shown in FIG. 3, the S-S' line, extending parallel to the LED circuit board 51, is distanced by a length L1 from the plane 'A' of the light incident surface at regular intervals, 8 mm for example, since such an area at a distance up to 8 mm is not usually overlapped with a display area of the LCD panel 20, and therefore does not influence brightness of a screen.

Data used for the simulation are as follows. The thickness d4, as shown in FIG. 2, of the light guiding plate 40 is 10 mm; the width and the length of the light guiding plate 40 are 106 mm respectively; the number of LEDs 52 employed by the light source part 50 is six; the width d5 of each LED 52 is 12 mm; the length of each LED 52 is 6 mm; a distance d6 between two adjacent LEDs 52 is 4.5 mm; the light guiding plate 40 is made of PMMA; an interval between stripes in the stripe patterns 42 is 1.1 mm; the diameter d1 of the half sphere shaped pattern 41 is 12 mm; the height d2, as shown in FIG. 1, of the half sphere shaped pattern 41 is 8 mm; the depth d7 of the half sphere shaped pattern 41 is 0.2 mm; a distance d8 between the adjacent half sphere shaped patterns 41 is 4.5 mm; and a distance d9 between the LED 52 and the plane 'A' of the light incident surface of the light guiding plate 40 is 2 mm. While a set of exemplary data is provided for demonstrative purposes, it should be understood that one or all of the above data facts may be changed to accommodate various LCDs.

FIG. 5a is a graph demonstrating brightness along line S-S' when a center of the LED 52 is disposed 2 mm lower than the center of the thickness d4 of the light incident surface, that is, z=−2 mm; FIG. 5b is a graph demonstrating brightness along line S-S' when a center of the LED 52 is disposed parallel with the center of the thickness d4 of the light incident surface, that is, z=0 mm; and FIG. 5c is a graph demonstrating brightness along line S-S' when a center of the LED 52 is disposed 2 mm higher than the center of the thickness d4 of the light incident surface, that is, z=+2 mm. As the thickness d4 of the demonstrative light guiding plate 40 is 10 mm, then 2 mm is 0.2 times the thickness d4 of the light guiding plate 40.

FIG. 5a shows 6 peaks of brightness along line S-S' correspondingly to the locations of the LEDs 52. That is, brightness is high in areas corresponding to the LEDs 52 and brightness is low in areas adjacent planes 'A' corresponding to locations between the LEDs 52. These peaks are also observed when the curved surface pattern is not formed on the light incident surface of the light guiding plate 40. Accordingly, brightness uniformity effect by the curved surface pattern may be decreased when a center of the LED 52 is disposed lower than the center of the thickness d4 of the light incident surface.

FIG. 5b shows that a height of the peaks of brightness is lowered and a degree of brightness uniformity is improved when the center of the LED 52 is parallel with a center of the thickness d4 of the light incident surface, as compared with when the center of the LED 52 is located below the center of the thickness d4 of the light incident surface as demonstrated in FIG. 5a.

FIG. 5c is a graph demonstrating when a center of the LED 52 is disposed higher than the center of the thickness d4 of the light incident surface. FIG. 5c shows that a degree of brightness uniformity is improved as compared with brightness uniformity demonstrated in FIG. 5a and FIG. 5b.

The above-mentioned simulation shows that a center of the LED 52 may preferably be disposed higher than the center of the thickness of the light incident surface in order to improve brightness uniformity. The center of the LED 52 may be disposed 0.1~0.3 times the thickness of the light incident surface higher than the center of the thickness of the light incident surface for improving brightness uniformity. In other words, d3 may be 0.1~0.3 times d4.

Herein below, improvement of light extraction efficiency by the half sphere shaped pattern 41 in the first exemplary embodiment of the LCD according to the present invention will be described with reference to FIG. 6.

Figure 6:
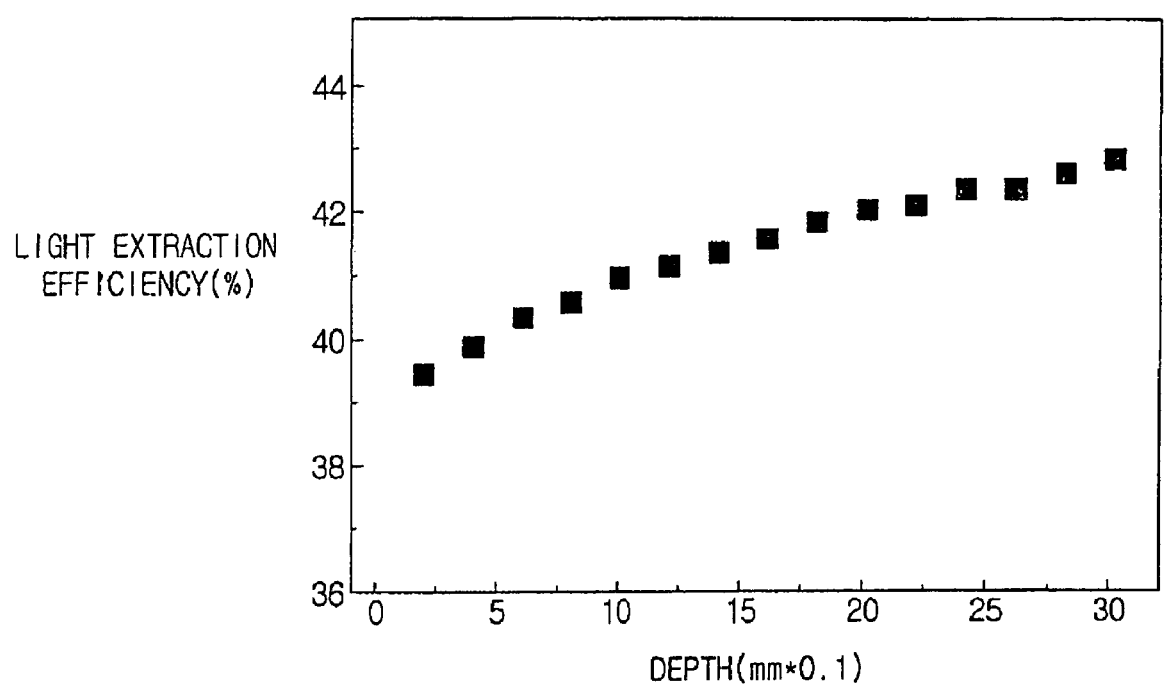
FIG. 6 is a graph showing light extraction efficiency according to a depth of a half sphere shaped pattern in the first exemplary embodiment of the LCD according to the present invention.

FIG. 6 is a graph showing light extraction efficiency according to a depth of a half-sphere shaped pattern in the first exemplary embodiment of the LCD according to the present invention.

The graph of FIG. 6 is acquired through simulation, and data used for the simulation is the same as the data used to acquire the graphs of FIGS. 5a through 5c. When the curved surface pattern is not formed on the light incident surface, the light extraction efficiency is approximately 29%. FIG. 6 shows that the light extraction efficiency is improved to 39% or more by the half sphere shaped pattern 41. In other words, light totally reflected by the half sphere shaped pattern 41 in the light guiding plate 40 and becoming extinct is decreased.

FIG. 6 shows the light extraction efficiency is continually increased from about 39% to about 42% as the depth d7 of the half sphere shaped pattern 41 is increased up to 3 mm. The depth d7 of the half sphere shaped pattern 41 may be 0.2 or more times the diameter d1 thereof.

Likewise, in the first embodiment, light efficiency and brightness uniformity may be improved by forming the half sphere shaped pattern 41 on the light incident surface of the light guiding plate 40 and by controlling the location of the LEDs 52 with respect to a center of the thickness of the light guiding plate 40.

A second exemplary embodiment of an LCD according to the present invention will be described with reference to FIG. 7.

Figure 7:
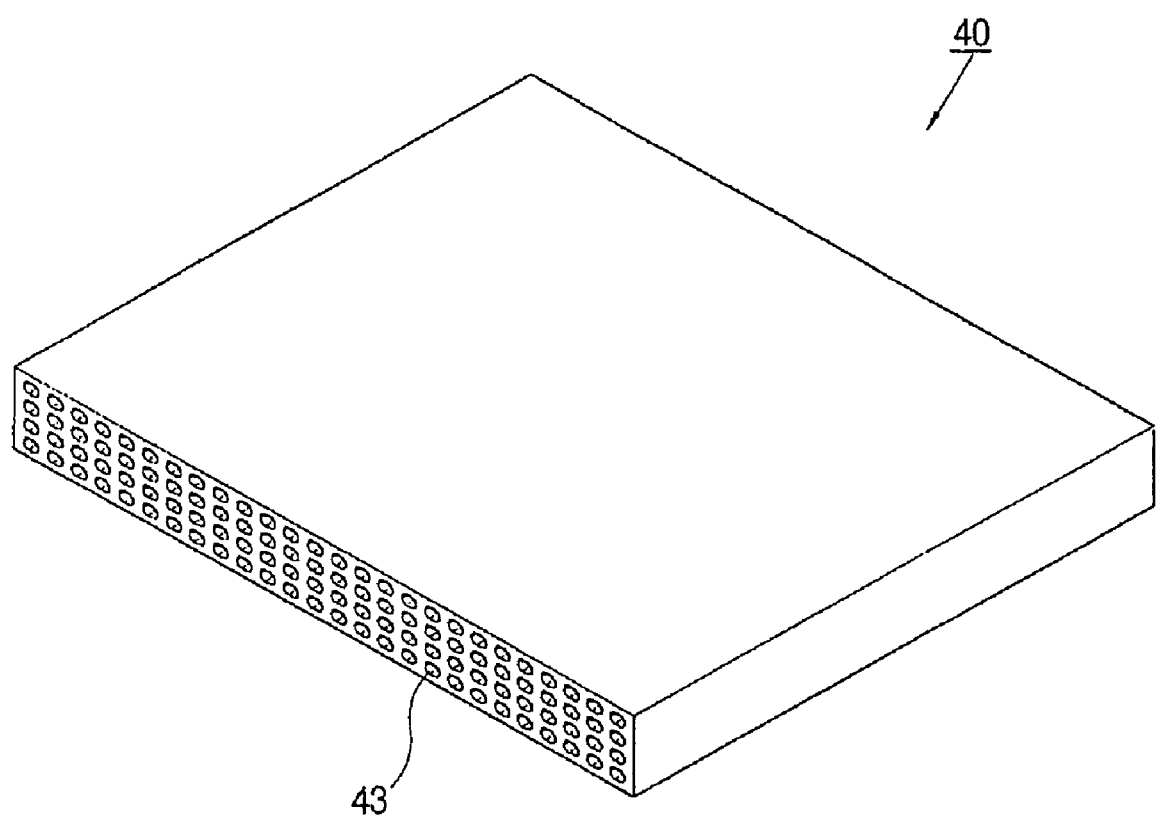
FIG. 7 is a perspective view of an exemplary main part of a second exemplary embodiment of an LCD according to the present invention.

FIG. 7 is a perspective view of an exemplary main part of an LCD, which shows a light guiding plate 40.

A half sphere shaped pattern 43 is formed on a light incident surface of the light guiding plate 40. The half sphere shaped pattern 43 is not limited to positions corresponding to locations of an LED 52 as in the first embodiment. Instead, the half sphere shaped pattern 43 is regularly disposed on the overall light incident surface, regardless of relative LED positioning.

A diameter and a depth of each shape within the half sphere shaped pattern 43 may be varied. When the diameter is 0.1 mm, 0.5 mm, and 0.8 mm respectively and the depth is the same as the diameter, the light extraction efficiency acquired through simulation is 37.6%, 38.2%, and 39.1% respectively. When performing the simulation, the number of shapes in the half sphere shaped pattern 43 is the same regardless of the diameter of the shapes. Since the light extraction efficiency of a light guiding plate without a curved surface pattern is 29%, the total reflection of light in the light guiding plate 40 having the half sphere shaped pattern 43 is decreased, thereby comparatively improving the light extraction efficiency.

Figure 8A:
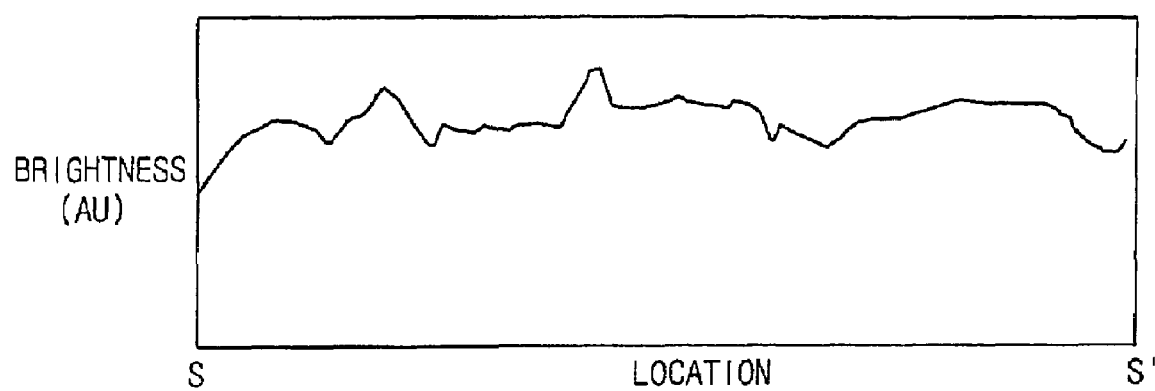
FIGS. 8a through 8c are graphs showing a distribution of brightness according to a diameter of a half sphere shaped pattern in the second exemplary embodiment of the LCD according to the present invention.
Figure 8B:
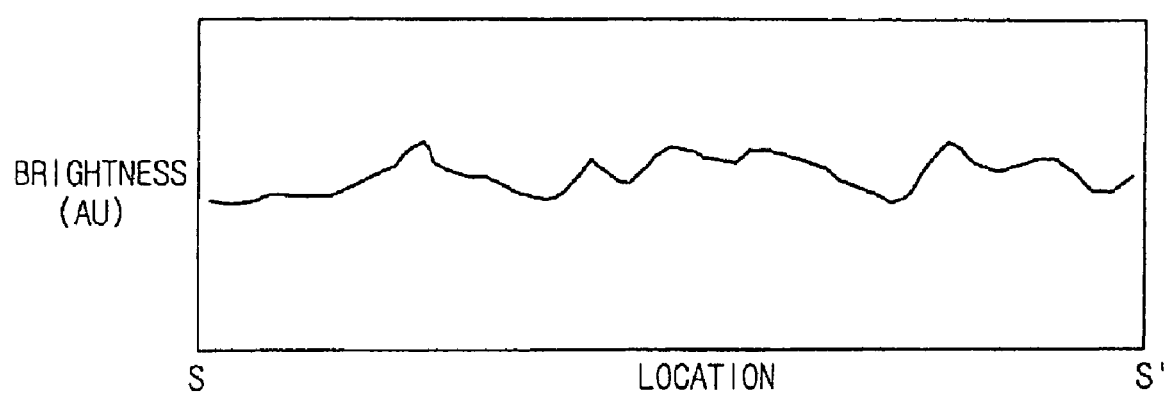
Figure 8C:
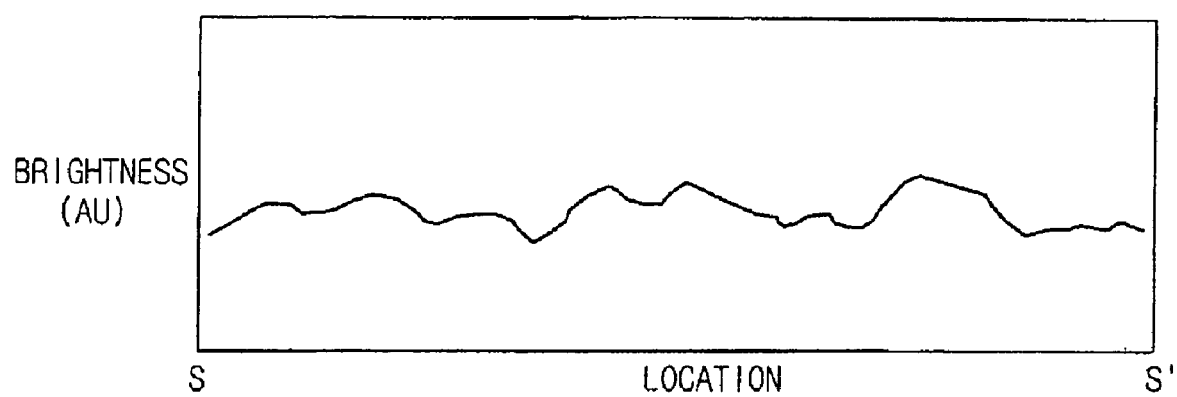

FIGS. 8a through 8c are graphs showing a distribution of brightness according to a diameter of shapes within a half-sphere shaped pattern in the LCD. The graphs show brightness of an S-S' line, such as located in FIG. 3, acquired through simulation similar to FIGS. 5a through 5c. The diameter of shapes of the half sphere shaped pattern 43 is 0.1 mm, 0.5 mm, and 0.8 mm respectively and the depth is the same as the respective diameters. FIGS. 8a through 8c show that brightness uniformity is improved as the diameter of the half sphere shaped pattern 43 is increased.

Likewise, both the light efficiency and the brightness uniformity are improved as the diameter of the shapes in the half sphere shaped pattern 43 is increased. The diameter of the half sphere shaped pattern 43 may be 0.05 times or more of the thickness d4 of the light incident surface of the light guiding plate 40.

Although not illustrated, various sizes of the shapes within the half sphere shaped pattern 43 may be provided on the light incident surface. Furthermore, density of the half sphere shaped pattern 43 may be different depending on the location of the shapes on the light incident surface, for example, the shapes may be more densely provided on an area corresponding to the LED 52.

Figure 9:
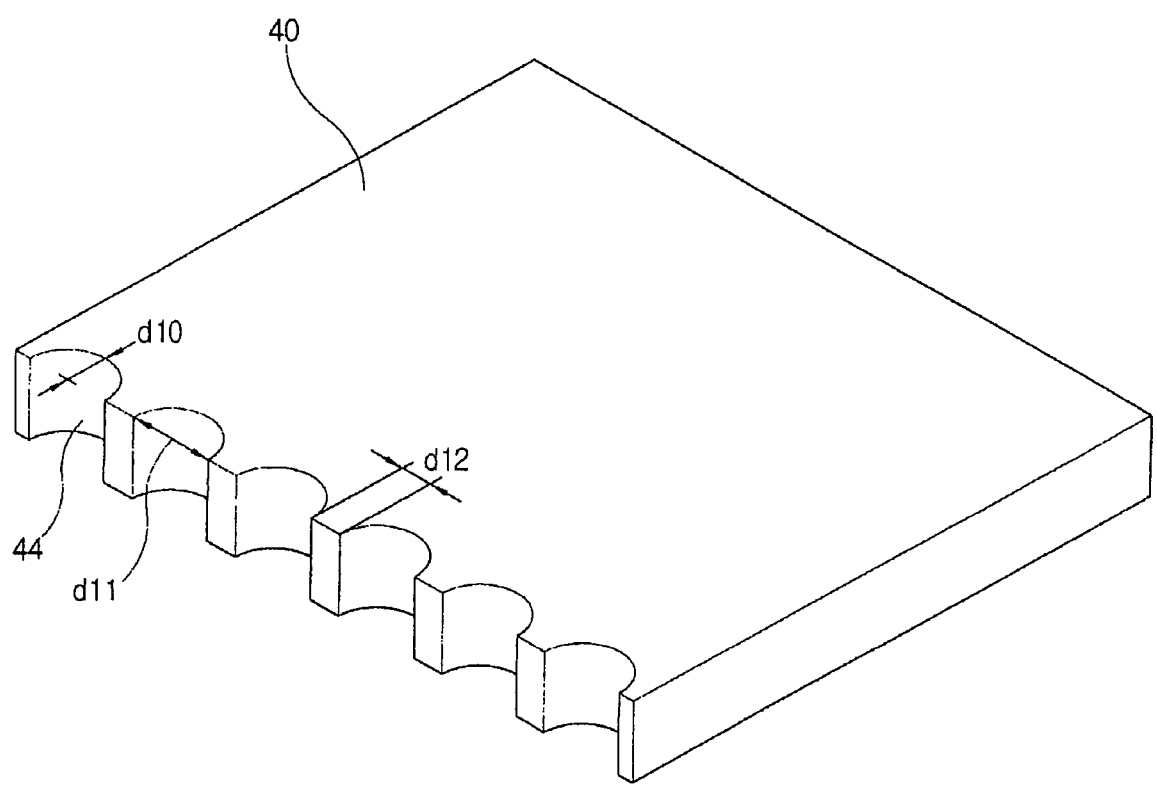
FIG. 9 is a perspective view of an exemplary main part of a third exemplary embodiment of an LCD according to the present invention.
Figure 10:
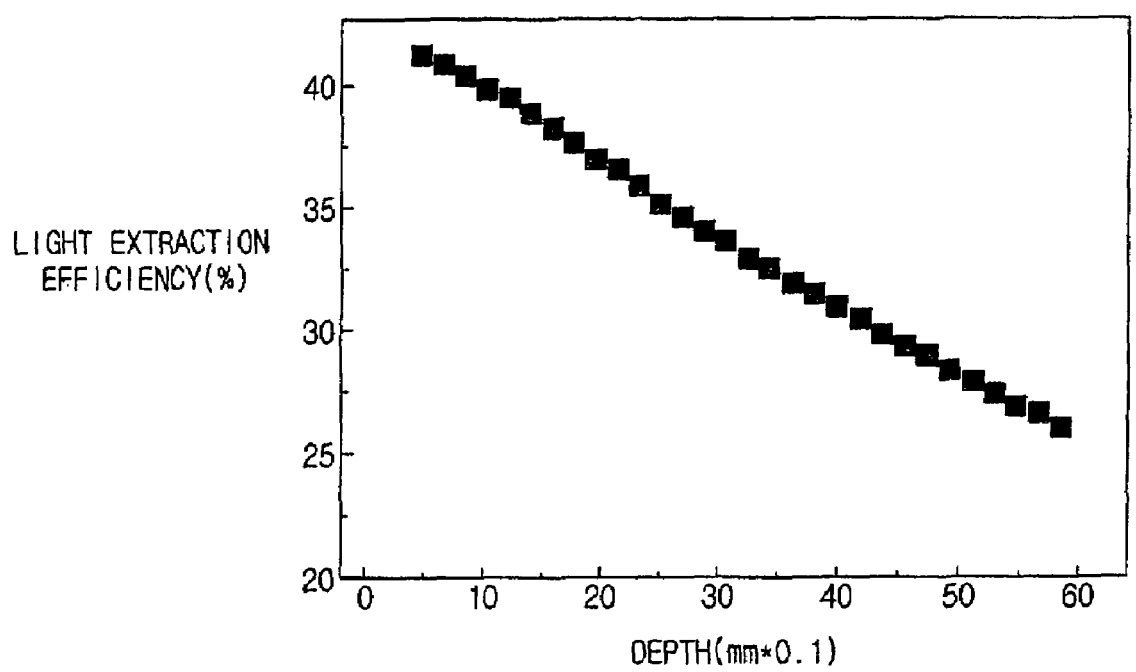
FIG. 10 is a graph showing light extraction efficiency according to a depth of a half sphere shaped pattern in the third exemplary embodiment of the LCD according to the present invention.

Hereinafter, a third exemplary embodiment of an LCD according to the present invention will be described with reference to FIGS. 9 and 10. FIG. 9 is a perspective view of an exemplary main part of the LCD, which is a light guiding plate 40. FIG. 10 is a graph showing light extraction efficiency according to a depth of a curved surface pattern in the LCD.

As shown in FIG. 9, a half cylinder shaped pattern 44 is formed concavely on a light incident surface of the light guiding plate 40. An extended direction of the half cylinder shaped pattern 44, in other words a length of the half cylinder shaped pattern 44 such as measured a longitudinal axis of the half cylinder shaped pattern 44, is the same as a thickness d4 of the light guiding plate 40 and the half cylinder shaped pattern 44 is disposed at regular intervals along the light incident surface. The half cylinder shapes of the half cylinder shaped pattern 44 are disposed at locations on the light incident surface corresponding to positions of the LED 52.

FIG. 10 is a result acquired from simulation with a depth d10 of the half cylinder shaped pattern 44 being varied. Data used for the simulation are as follows. A diameter d11 of the half cylinder shaped pattern 44 is 12 mm; a distance d12 between the adjacent half cylinder shaped pattern 44 is 4.5 mm; and the other features of the light guiding plate 40 and LEDs 52 are the same as the features used in FIGS. 5a through 5c. As shown in FIG. 10, the light extraction efficiency is decreased as the depth d10 of the half cylinder shaped pattern 44 is increased. Specifically, the light extraction efficiency drops 30% or less when the depth d10 of the half cylinder shaped pattern is about 3 mm or more. It is similar to the value 29% when a curved surface pattern is not formed on the light incident surface and shows that brightness is decreased when the depth d10 of the half cylinder shaped pattern is increased more than 3 mm. Accordingly, in order to maintain and improve light extraction efficiency as compared to a light incident surface not having a curved surface pattern, the depth d10 of the half cylinder shaped pattern is preferably limited, and may be 0.2 times or less of the diameter d11 of the half cylinder shaped pattern.

Hereinafter, fourth through sixth exemplary embodiments of an LCD according to the present invention will be described with reference to FIGS. 11 through 13.

Figure 11:
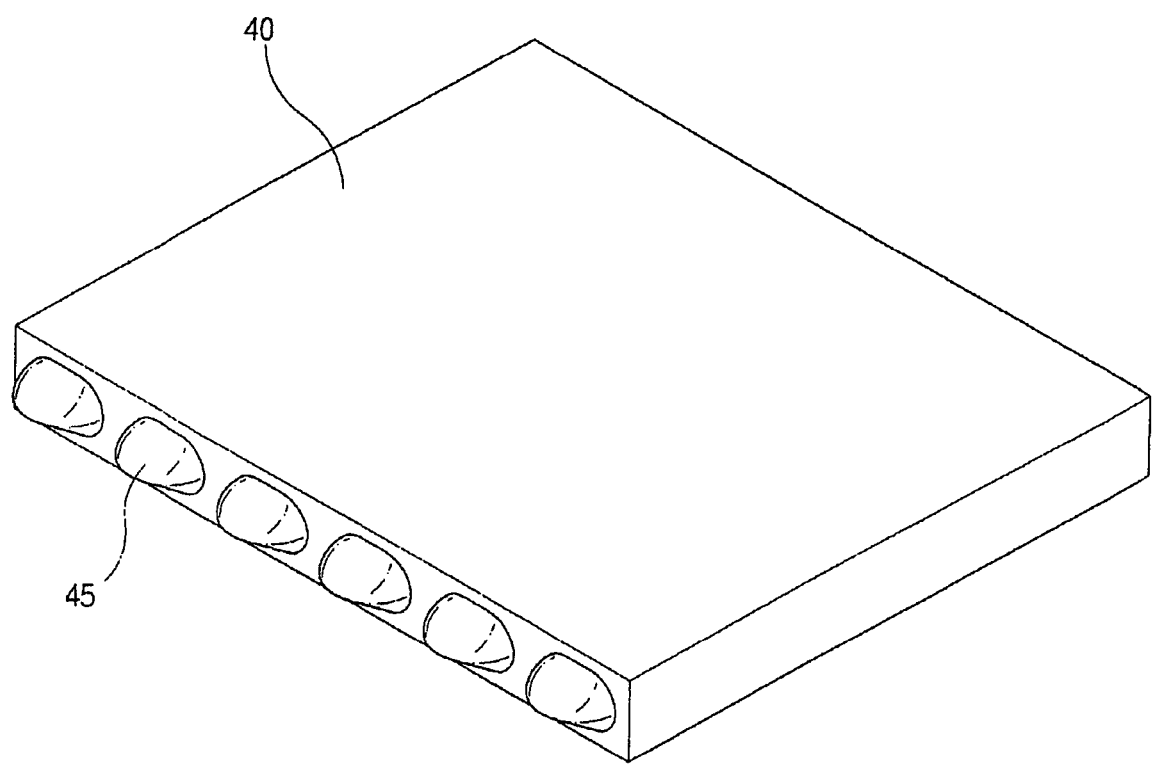
FIGS. 11 through 13 are perspective views of exemplary main parts of fourth through sixth exemplary embodiments of an LCD according to the present invention respectively.
Figure 12:
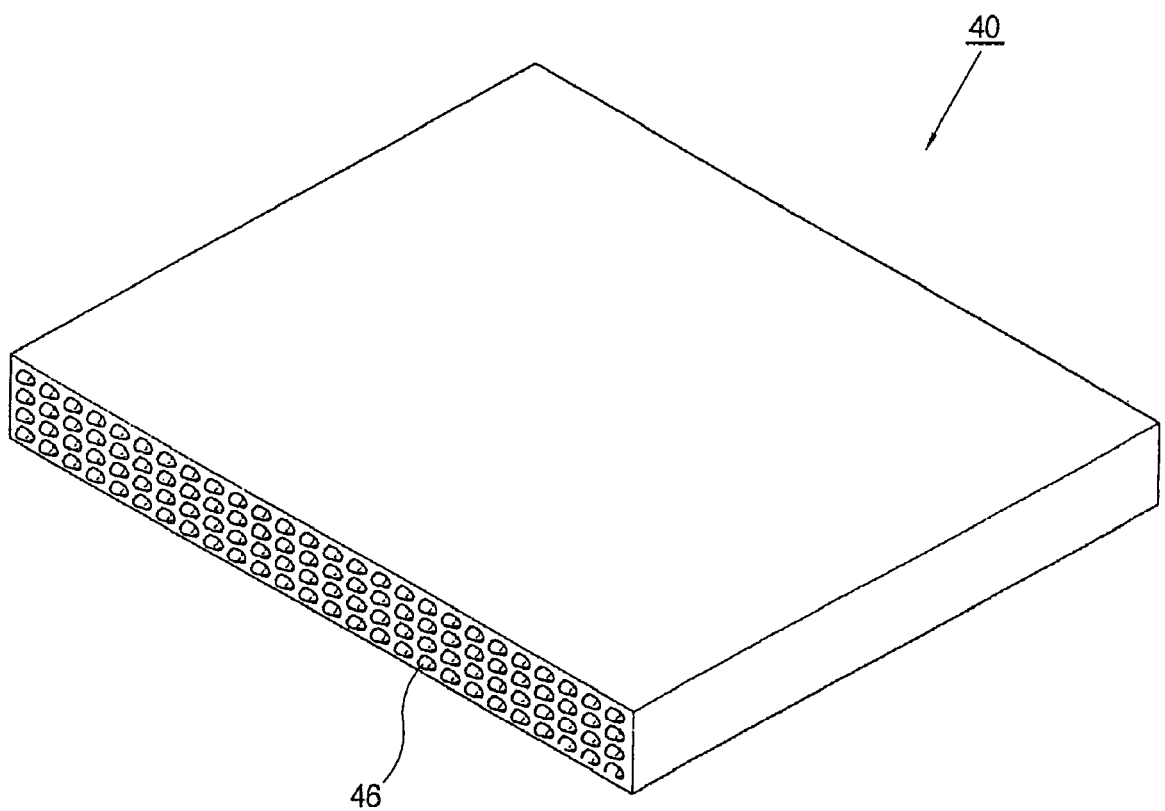
Figure 13:
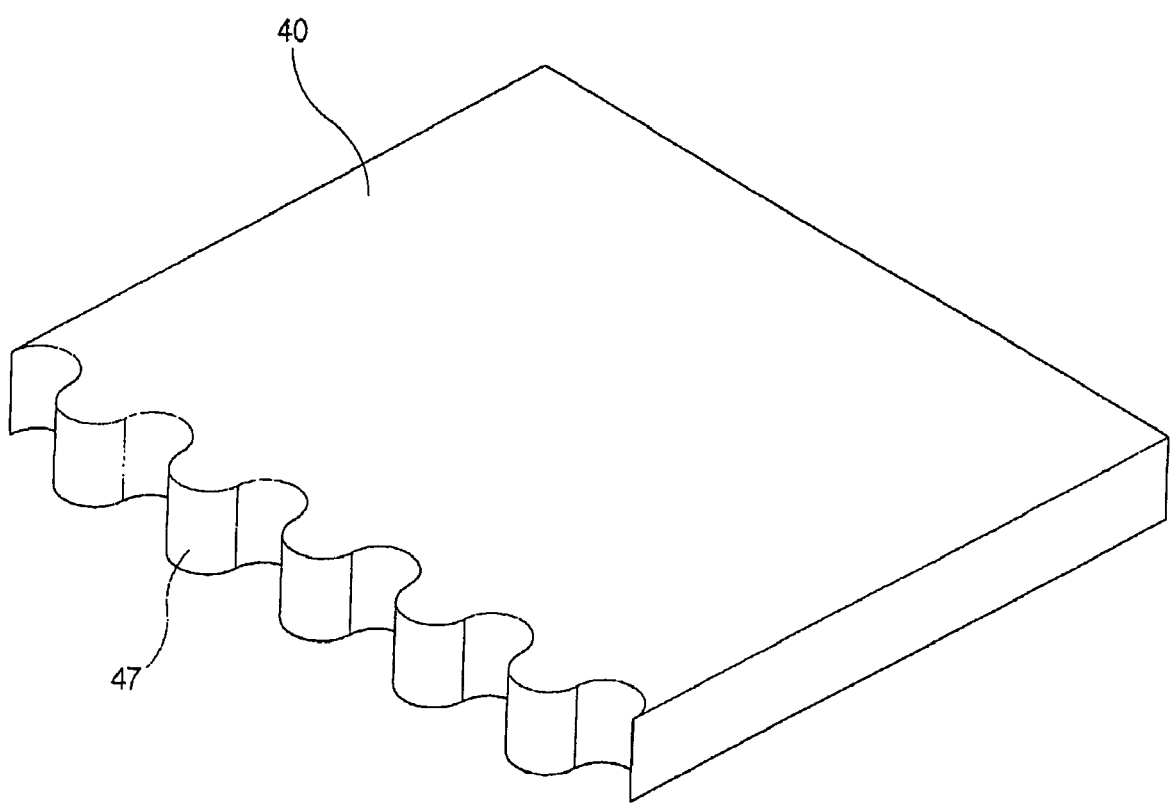

FIGS. 11 through 13 show a light guiding plate 40.

As shown in FIG. 11, a half sphere shaped pattern 45 is formed outwardly (convexly) on a light incident surface of the light guiding plate 40 according to the fourth exemplary embodiment. The projected half sphere shapes in the projected half sphere shaped pattern 45 is disposed at locations of the light incident surface corresponding to locations of the LEDs 52.

As shown in FIG. 12, a half sphere shaped pattern 46 is formed outwardly (convexly) on the light incident surface of the light guiding plate 40 according to the fifth exemplary embodiment. However, unlike the fourth exemplary embodiment illustrated in FIG. 11, the shapes within the projected half sphere shaped pattern 46 are not limited to corresponding with the LEDs 52, but instead are formed on the overall light incident surface. Also, in order to accommodate the additional shapes, the size of the shapes of the projected half sphere shaped pattern 46 is reduced as compared with the size of the shapes in the projected half sphere shaped pattern 45 in the fourth exemplary embodiment.

Although not illustrated, various sizes of the shapes within the half sphere shaped pattern 46 may be provided on the light incident surface. Furthermore, density of the half sphere shaped pattern 46 may be different depending on the location of the shapes on the light incident surface, for example, the shapes may be more densely provided on an area corresponding to the LED 52.

As shown in FIG. 13, a half cylinder shaped pattern 47 is formed on the light incident surface of the sixth exemplary embodiment of the light guiding plate 40 according to the present invention. Concave portions of the half cylinder shaped pattern 47 are disposed corresponding to locations of an LED 52 and the half cylinder shaped pattern 47 is extended in the thickness direction of the light guiding plate 40. A space between the half cylinder shaped patterns 47 is made to be rounded, such as a convex portion of the half cylinder shaped pattern 47, and thus differs from the planar surfaces in the third embodiment illustrated in FIG. 9, therefore, the light incident surface in this embodiment has a wave shape. Accordingly, light incident to the space between the half cylinder shaped patterns 47 is diffused in different directions and brightness uniformity may be improved. The sixth exemplary embodiment may variously be modified. The half cylinder shaped pattern 47 may not necessarily correspond to locations of the LED 52 and its density and size may be different depending on its location.

The abovementioned embodiments may variously be modified, and any of the above-described embodiments may be combined. In alternate embodiments, the light source part 50 may be disposed in a pair on both sides of the light guiding plate 40 facing each other. Thus, any of the curved surface patterns described herein, or any combination of the curved surface patterns described herein, may be formed on opposite light incident faces. Further, the light guiding plate 40 may be formed in a wedge type.

Alternatively, half cylinder shaped patterns may be formed outwardly on the light incident surface of the light guiding plate 40.

Although a few embodiments of the present invention have been shown and described, it will be appreciated by those skilled in the art that changes may be made in these embodiments without departing from the principles and spirit of the invention, the scope of which is defined in the appended claims and their equivalents. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A liquid crystal display comprising:
   a liquid crystal display panel;
   a light guiding plate disposed adjacent the liquid crystal display panel and including a light incident surface having a curved surface pattern formed thereon, the light incident surface having a first edge and an opposite second edge, the first edge closer to the liquid crystal display panel than the second edge; and
   a point light source facing the light incident surface and disposed closer to the first edge of the light incident surface than to the second edge of the light incident surface.

2. The liquid crystal display according to claim 1, wherein the point light source is disposed within a range of 0.1 to 0.3 times a thickness of the light incident surface closer to the first edge of the light incident surface than to a center of the thickness of the light incident surface.

3. The liquid crystal display according to claim 1, wherein the point light source is a light emitting diode.

4. The liquid crystal display according to claim 3, wherein the light emitting diode is disposed in plural at regular intervals and the curved surface pattern is respectively formed corresponding to the light emitting diode.

5. The liquid crystal display according to claim 1, wherein the curved surface pattern includes a plurality of half sphere shaped patterns formed outwardly on the light incident surface.

6. The liquid crystal display according to claim 1, wherein the curved surface pattern includes a plurality of half sphere shaped patterns formed concavely on the light incident surface.

7. The liquid crystal display according to claim 6, wherein the plurality of half sphere shaped patterns is formed on an overall light incident surface.

8. The liquid crystal display according to claim 6, wherein a diameter of each of the plurality of half sphere shaped patterns is 0.05 times or more than a thickness of the light incident surface.

9. The liquid crystal display according to claim 6, wherein a depth of each of the plurality of half sphere shaped patterns is 0.2 times or more than a diameter of each of the plurality of half sphere shaped patterns.

10. The liquid crystal display according to claim 1, wherein the curved surface pattern includes a plurality of half cylinder shaped patterns formed outwardly on the light incident surface.

11. The liquid crystal display according to claim 1, wherein the curved surface pattern includes a plurality of half cylinder shaped patterns formed concavely on the light incident surface.

12. The liquid crystal display according to claim 11, wherein the half cylinder shaped patterns are formed in a thickness direction of the light incident surface.

13. The liquid crystal display according to claim 11, wherein a depth of each of the plurality of half cylinder shaped patterns is 0.2 times or less than a diameter of each of the plurality of half cylinder shaped patterns.

14. The liquid crystal display according to claim 1, wherein the curved surface pattern includes a wave pattern formed on the light incident surface.

15. The liquid crystal display according to claim 1, wherein the curved surface pattern includes a plurality of ellipsoid shapes formed on the light incident surface.

16. The liquid crystal display according to claim 1, further comprising a plurality of point light sources, wherein the curved surface pattern includes a plurality of curved shapes arranged in a one to one correspondence with the point light sources.

17. The liquid crystal display according to claim 1, further comprising a plurality of point light sources, wherein the curved surface pattern includes a plurality of curved shapes outnumbering the point light sources and dispersed along the light incident surface.

18. The liquid crystal display according to claim 1, wherein the curved surface pattern including a curved shape, the curved shape having a surface defining variable distances from the point light source.

19. A backlight assembly comprising:
   a light guiding plate including a light incident surface having a curved surface pattern formed thereon; and
   a point light source facing the light incident surface and disposed closer to a first edge of the light incident surface than to a second edge of the light incident surface,
   wherein the first edge of the light incident face is also an edge of a light exiting surface of the light guiding plate.

20. The backlight assembly according to claim 19, further comprising a plurality of point light sources, wherein the curved surface pattern includes a plurality of curved shapes, each curved shape aligned with each point light source, respectively.

21. The backlight assembly according to claim 20, further comprising a planar surface on the light incident surface disposed between adjacent curved shapes.

22. The backlight assembly according to claim 19, wherein the curved surface pattern includes a plurality of curved shapes, each curved shape having a surface defining variable distances from the point light source.

23. The backlight assembly according to claim 19, wherein the point light source is a light emitting diode, a center of the light emitting diode spaced a distance within a range of 0.1 to 0.3 times a thickness of the light incident surface from a center of the light incident surface in a direction towards the first edge of the light incident surface.

* * * * *